United States Patent [19]

Yamamuro et al.

[11] Patent Number: 4,543,077
[45] Date of Patent: Sep. 24, 1985

[54] METHOD AND APPARATUS FOR CONTROLLING CONTINUOUSLY VARIABLE V-BELT TRANSMISSION

[75] Inventors: Sigeaki Yamamuro, Zushi; Hiroyuki Hirano; Yoshiro Morimoto, both of Yokosuka; Yoshikazu Tanaka, Yokohama, all of Japan

[73] Assignee: Nissan Motor Co., Ltd., Yokohama, Japan

[21] Appl. No.: 362,489

[22] Filed: Mar. 26, 1982

[30] Foreign Application Priority Data

Mar. 28, 1981 [JP] Japan ............... 56-44749

[51] Int. Cl.⁴ ........................................... F16H 11/06
[52] U.S. Cl. ......................................... 474/12; 474/18; 474/28
[58] Field of Search ............... 474/17, 18, 28, 70, 474/11, 12

[56] References Cited

U.S. PATENT DOCUMENTS

| | | | |
|---|---|---|---|
| 3,200,666 | 8/1965 | Schrodt et al. | 474/28 X |
| 3,596,528 | 8/1971 | Dittrich et al. | 474/28 X |
| 3,600,961 | 8/1971 | Rattunde et al. | 474/28 X |
| 4,088,036 | 5/1978 | Hillman | 474/18 X |
| 4,107,776 | 8/1978 | Beale | 364/431 |
| 4,174,641 | 11/1979 | Hillman | 474/18 X |
| 4,228,691 | 10/1980 | Smirl | 474/12 |
| 4,229,988 | 10/1980 | Rattunde | 474/28 |
| 4,281,567 | 8/1981 | Maurer | 74/866 |
| 4,291,594 | 9/1981 | Baudoin | 74/857 |
| 4,304,150 | 12/1981 | Lupo et al. | 74/677 |
| 4,387,608 | 6/1983 | Mohl et al. | 74/866 |
| 4,403,974 | 9/1983 | Sherman et al. | 474/11 |
| 4,403,975 | 9/1983 | Rattunde | 474/18 |

FOREIGN PATENT DOCUMENTS

| | | | |
|---|---|---|---|
| 5235679 | 5/1980 | Australia . | |
| 005565 | 11/1979 | European Pat. Off. . | |
| 0044202 | 7/1981 | European Pat. Off . | |
| 1256023 | 12/1967 | Fed. Rep. of Germany | 474/28 |
| 2703487 | 8/1977 | Fed. Rep. of Germany | 474/28 |
| 1229278 | 9/1960 | France | 474/28 |
| 55-138137 | 1/1980 | Japan . | |
| 55-65755 | 5/1980 | Japan . | |
| 1556888 | 2/1976 | United Kingdom | 74/866 |
| 1525674 | 9/1978 | United Kingdom . | |
| 2033502 | 5/1980 | United Kingdom | 474/28 |

Primary Examiner—Lawrence J. Staab
Assistant Examiner—Dwight G. Diehl
Attorney, Agent, or Firm—Schwartz, Jeffery, Schwaab, Mack, Blumenthal & Evans

[57] ABSTRACT

Revolution speed of a drive pulley and a parameter indicative of an output of the engine are detected. A desired value in the engine revolution speed is obtained using a predetermined function for any value in the parameter indicative of the engine output. The reduction ratio is controlled in such a manner as to maintain the revolution speed of the drive pulley in a predetermined relationship with the desired value in the engine revolution speed.

7 Claims, 12 Drawing Figures

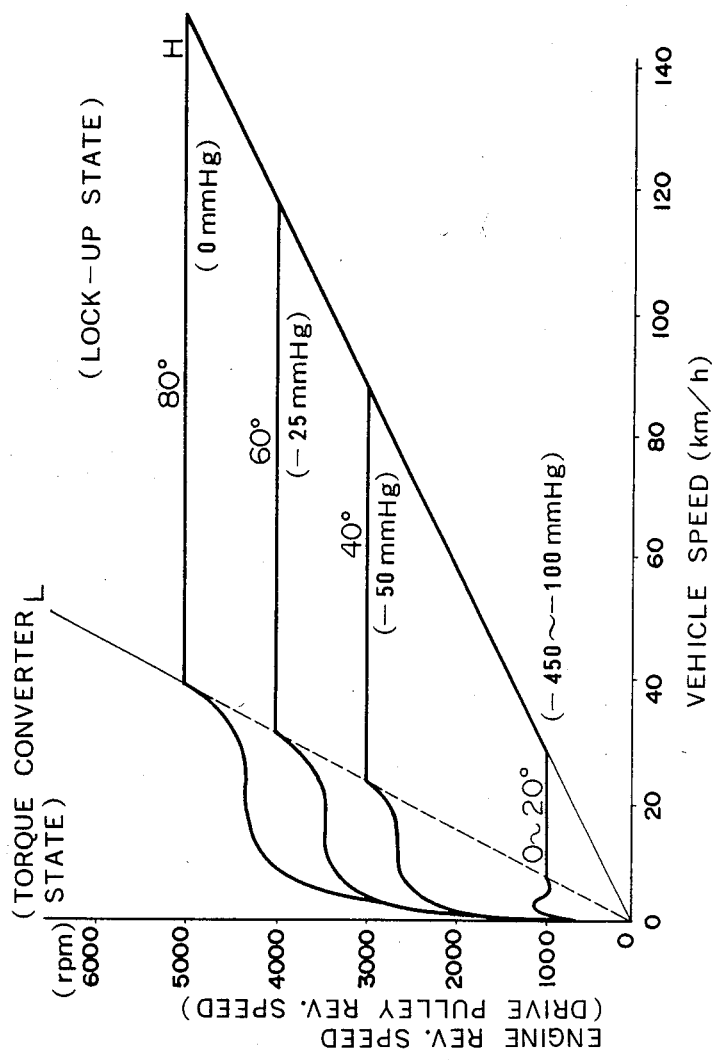

METHOD AND APPARATUS FOR CONTROLLING CONTINUOUSLY VARIABLE V-BELT TRANSMISSION

BACKGROUND OF THE INVENTION

1. Field of the Invention

The present invention relates to a method and apparatus for controlling a continuously variable V-belt transmission.

2. Description of the Prior Art

A conventional method for controlling a continuously variable transmission, is disclosed in laid-open Japanese utility model application No. Sho 55-138137, which also describes a control apparatus as shown in FIG. 1.

Power fron an engine 201 is transmitted via a continuously variable transmission 202 to wheels 203. A fuel control lever 204 of the engine 201 is actuated by a servo motor 205, a shift lever 206 is actuated by a servo motor 207 and a brake 208 is actuated by a servo motor 209. The servo motors 205, 207 and 209 are controlled by command signals 211, 212 and 213, respectively, from a speed control unit 210, and their position detecting signals 214, 215 and 216 are fed back to the speed control unit 210. The engine 201 is provided with an engine sensor 217 with which an oil temperature of the engine 201 and a vibration thereof are detected and signals 218 representing this information is fed to the speed control unit 201. The continuously variable transmission 202 is provided with a transmission sensor 219 with which an oil pressure of the continously variable transmission 202, an oil temperature thereof and an oil amount thereof are detected and signals representing this information is fed to the speed control unit 210. An input revolution speed to the continuously variable transmission 202 and an output revolution speed thereof are detected by revolution speed sensors 221 and 222, respectively, and signals 223 and 224 representing this information is fed to the speed control unit 210. Also fed to the speed control unit 210 is a signal 226 produced by a shift command lever 225 which is manipulated by a driver. The speed control unit 210 stores a plurality of patterns of actions of the engine 201, continuously variable transmission 202 and brake 208 and also stores the optimum conditions of oil temperature and vibration of the engine 201 and the optimum conditions of oil pressure, oil temperature and oil amount of the continuously variable transmission 202, and it actuates the servo motors 205, 207 and 209 dependent upon the information stored therein and those signals generated by the above mentioned sensors so as to effect a shift control.

The conventional control method of this kind requires a considerable numbers of sensors, such as a position detecting sensor for each of the respective servo motors, an input and output rotational speed sensor, an engine sensor and a transmission sensor, thus requiring a very expensive control apparatus to carry out this method, another problem is that since the conventional sped control unit stores a plurality of patterns of actions, the control becomes necessarily complicated, thus inviting trouble, malfunction and the like.

SUMMARY OF THE INVENTION

With a method and an apparatus for controlling a continuously variable transmission according to the present invention, what are detected are only two inputs, one being a revolution speed of a drive pulley, the other being a parameter indicative of output torque of an engine.

With a method and an apparatus for controlling a continuously variable transmission, a predetermined function defining a desired value of engine revolution speed for any value in the parameter indicative of the output torque of the engine is used to determine a desired value in engine revolution speed for a value in the parameter.

An object of the present invention is to provide a method and an apparatus for controlling a continuously variable transmission which require a relatively small number of sensors, each detecting input variables, and relatively less complicated controls.

With a method and an apparatus for controlling a continuously variable transmission according to the present invention, a kickdown operation is provided by setting the speed of action of a shift motor at a rate higher than that of a V-belt pulley mechanism so that upon depressing an accelerator pedal rapidly to cause a kickdown, a spool of a shift control valve which requlates fluid supply to and discharge from the cylinder chambers of a drive and a driven pulley is displaced beyond a new balanced position toward a higher reduction side before being returned back to a new balanced position as a result of movement of the pulleys to a new position corresponding to the new balanced position of the spool of the shift control valve.

BRIEF DESCRIPTION OF THE DRAWINGS

The present invention is more specifically described in connection with the accompanying drawings, wherein:

FIG. 12 is a shift pattern diagram of the continuously variable transmission.

DETAILED DESCRIPTION OF THE INVENTION

Hereinafter, the present invention will be explained along with FIGS. 2 through 10 of the accompanying drawings illustrating the embodiment.

Figure 1:
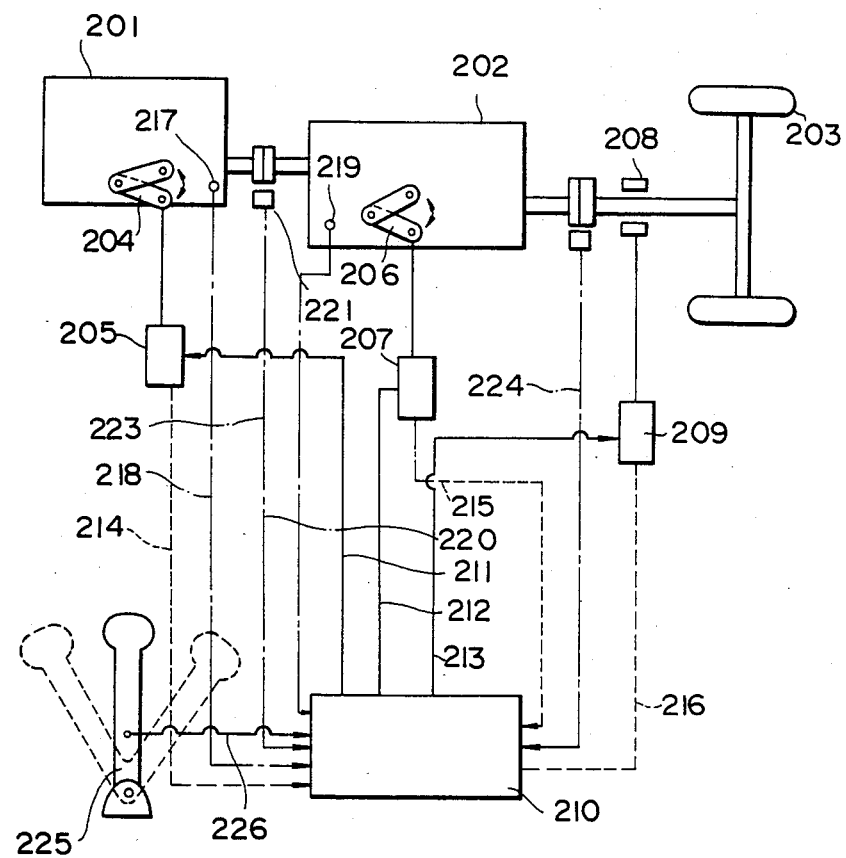
FIG. 1 is a block diagram of a conventional control apparatus for a continuously variable transmission.
Figure 2:
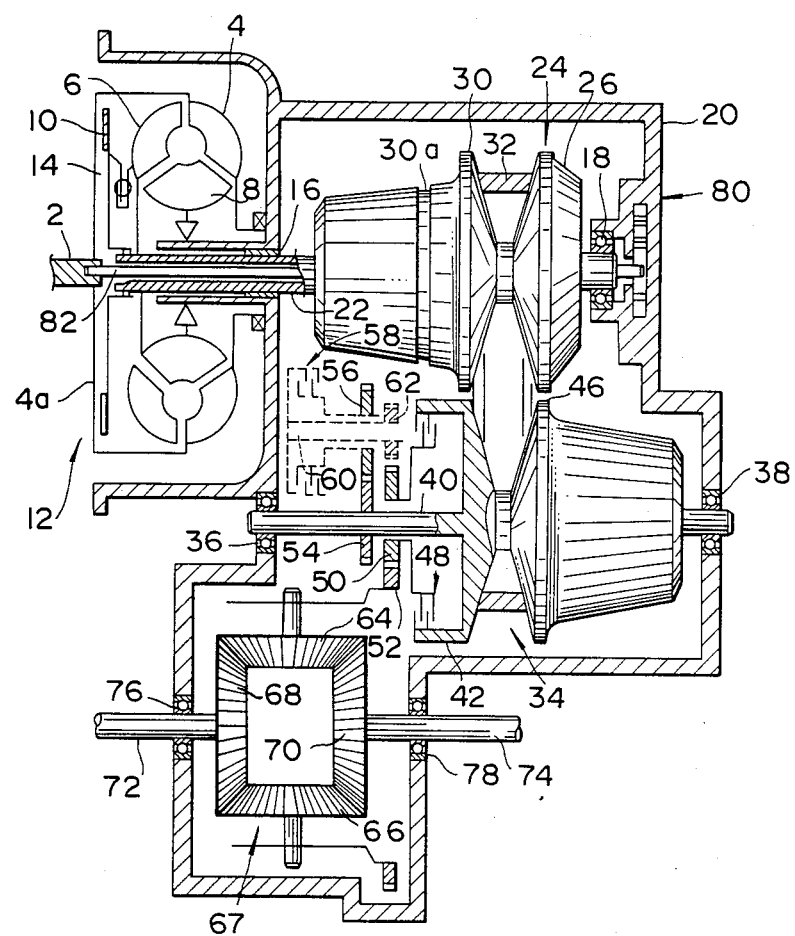
FIG. 2 is a diagrammatic view illustrating a power transmission mechanism of a continuously variable transmission.
Figure 3:
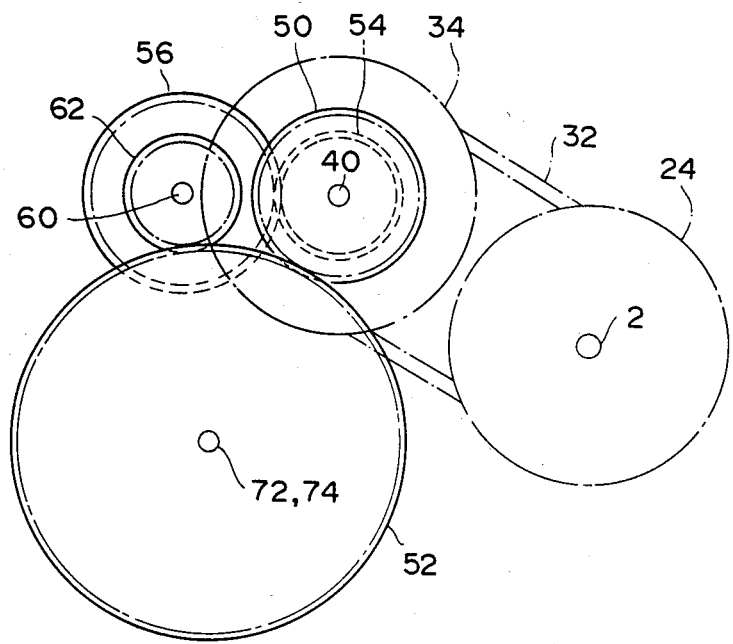
FIG. 3 is a layout of the shafts used in the continuously variable transmission shown in FIG. 2.

First, a power transmission mechanism of a continuously variable transmission to which a shift control method according to the present invention is applied is shown in FIGS. 2 and 3.

Figure 4:
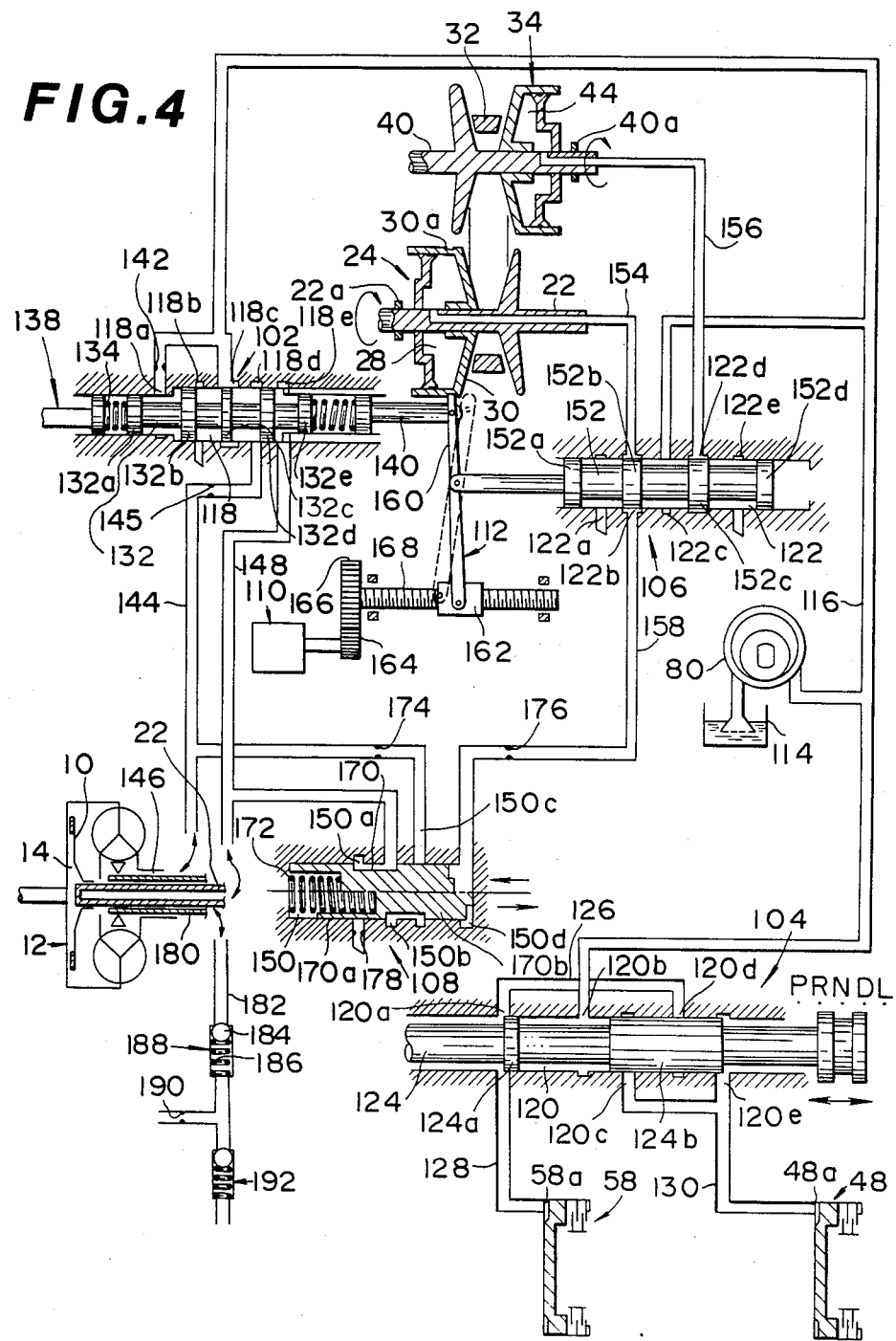
FIG. 4 is a hydraulic control system for the power transmission mechanism shown in FIG. 2.

Attached to an engine output shaft 2 rotatable in unison with a crankshaft of an engine (both not illustrated) is a torque converter 12 (which may be replaced with a fluid coupling) including a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14 and operates such that when the oil pressure within the lock-up clutch oil chamber 14 becomes lower than that within the interior of the torque converter 12, this difference in oil pressure urges the lock-up clutch 10 to be pressed against the member 4a to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 and an axially movable conical disc 30 which is disposed to face the axially fixed conical disc 26 to define a V-shaped pulley groove therebetween and which is allowed to slide in an axial direction of the driven shaft 22 in response to an oil pressure created within a drive pulley cylinder chamber 28 (see FIG. 4). The drive pulley 24 is drivingly connected to a driven pulley 34 via a V-belt 32, this driven pulley 34 being arranged on a driven shaft 40 which is rotatably supported by the case 20 via the bearings 36 and 38. The driven pulley 34 comprises an axially fixed conical disc 42 fixed to the driven shaft 40 and an axially movable conical disc 46 which is disposed to face the fixed conical disc 42 in such a manner as to define a V-shaped pulley groove and which is allowed to slide in an axial direction of the driven shaft 40 in response to an oil pressure created in a driven pulley cylinder chamber 44 (FIG. 4). The axially fixed conical disc 42 is drivingly connectable via a forward drive multiple disc clutch 48 to a forward drive gear 50 rotatably supported on the driven shaft 40, this forward drive gear being in mesh with a ring gear 52. Fixed to the driven shaft 40 is a reverse drive gear 54 which is in mesh with an idle gear 56. The idle gear 56 is drivingly connectable via a reverse drive multiple disc clutch 58 to an idle shaft 60 which has fixed thereto another idle gear 62 that is in mesh with the ring gear 52. (Although in FIG. 2 the idle gear 62, idle shaft 60 and reverse drive multiple disc clutch 58 are illustrated in positions displaced from the actually positions thereof for ease of illustration, the idle gear 62 and ring gear 52 are shown as out of mesh with each other, but, they are actually in mesh with each other as will be understood from FIG. 3). The ring gear 52 has attached thereto a pair of pinion gears 64 and 66, output shafts 72 and 74 being coupled with side gears 68 and 70, respectively, which are in mesh with the pinion gears 64 and 66 to cooperate to form a differential 67, and the output shafts 72 and 74 which are supported via bearings 76 and 78, respectively, extending outwardly of the case 20 in the opposite directions. These output shafts 72 and 74 are connected to road wheels (not shown), respectively. In the drawing, there is arranged on the right side of the bearing 18 on oil pump 80 of the internally toothed gearing type which serves as a source of oil pressure, this oil pump 80 being driven by the engine output shaft 2 via an oil pump drive shaft 82 extending through the hollow driven shaft 22. Rotational power fed from the engine output shaft 2 to the continuously variable transmission, viz., a combination of torque converter with lock-up mechanism, continuously variable transmission mechanism and differential, is transmitted via torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the output shafts 72 and 74 to rotate them in the forward rotational direction, whereas, in the case the reverse drive multiple disc clutch 58 is engaged with the forward drive multiple disc clutch released, the rotation of the shaft 40 is transmitted via the reverse drive gear 54, idle gear 56, idle shaft 60, idle gear 62, ring gear 52 and differential 67 to the output shafts 72 and 74 to rotate them in the reverse rotational direction. During this transmission of power, the rotation ratio between the drive pulley 24 and driven pulley 34 may be varied by moving the aixally movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 cause a reduction in radius of the diameter of the drive pulley 24 contacting with the V-belt 32 and an increase in radius of the diameter of the driven pulley 34 contacting with the V-belt 32, resulting in an increase in reduction ratio. If the axially movable conical discs 30 and 46 are moved in the respective reverse directions, a reduction ratio is decreased. Depending upon power transmission circumstances, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when oil pressure is drained from the lock-up clutch oil chamber 14 to press the lock-up clutch 10 against the member 4a integral with the pump impeller 4.

Next, a hydraulic pressure control system for the continuously variable transmission is explained. As shown in FIG. 4, the hydraulic pressure control system comprises an oil pump 80, line pressure regulator valve 102, a manual valve 104, shift ratio control valve 106, lock-up valve 108, shift motor 110, and a shift operating mechanism 112.

The oil pump 80 which is driven by the engine output shaft 2 as mentioned before discharges the oil within the tank 114 into the oil conduit 116. However, the oil pump drive shaft 82 is not illustrated in FIG. 4 for the sake of simplicity of illustration. The oil conduit 116 leads to ports 118a and 118c of the line pressure regulator valve 102 and the oil pressure therein will be regulated into a line pressure. The oil conduit 116 communicates with a port 120b of the manual 104 and a port 122c of the control valve 106.

The manual valve 104 has a valve bore 120 provided with five ports 120a, 120b, 120c, 102d and 120e, and a spool 124 formed with two lands 124a and 124b received in the valve bore 120, which spool 124 is actuated by a shift lever (not shown) between five detent positions "P", "R", "N", "D" and "L". The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive line pressure therein. When the spool 124 is set in "P" position, the port 120b supplied with the line pressure is covered by a land 124b, so that the cylinder chamber 58a of the reverse drive multiple disc clutch 58 is drained via the oil conduit 126 and port 120d and the cylinder chamber 48a of the forward drive multiple disc clutch 48 is drained via the port 120e. When the spool 124 is set in "R" position, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in "N" position, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is in "P" position. When the spool 124 is set in "D" or "L" position, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in "P" position or "N" position, both the forward drive multiple disc clutch 48 and reverse drive multiple disc clutch 58 are released to interrupt the transmission of power, thus preventing the rotation of output shafts 72 and 74; when the spool 124 is set in "R" position, the reverse drive multiple disc clutch 58 is engaged so as to drive the output shafts 72 and 74 in the reverse rotational direction; when the spool 124 is set in "D" or "L" position, the forward drive multiple disc clutch 48 is engaged so as to drive the output shafts 72 and 74 in the forward rotational direction. Although there occurs no difference in the respect of a hydraulic circuit between "D" position and "L" position as mentioned above, both of the positions are electrically detected to actuate the shift motor 110 in such a manner as to effect a shift control in accordance with different shift patterns.

The line pressure regulator valve 102 comprises a valve bore 118 provided with five ports 118a, 118b, 118c, 118d and 118e, a spool 132 formed with five lands 132a, 132b, 132c, 132d and 132e, and springs 134 and 136 arranged on the both ends of the spool 132. It is to be noted that the lands 132a and 132e provided on the both end portions of the spool 132 are smaller in diameter than the intermediate lands 132b, 132c and 132d. The left side spring 134 is disposed between the left end of the spool 132 and a throttle link 138, which throttle link 138 is urged for leftward movement as the throttle opening degree increases or for rightward movement as the throttle opening degree decreases. Therefore, if the throttle opening is great, the force created by the spring 134 urging the spool 132 rightwardly is small, whereas, if the throttle opening degree is small, the force by the spring 134 urging the spool rightwardly is great. A right side spring 136 is disposed between the right end of the spool 132 and a rod 140 cooperating with the axially movable conical disc 30 of the drive pulley 24. Therefore, if the axially movable conical disc 30 of the drive pulley 24 has moved rightwardly (viz., in the case a reduction ratio has decreased), the force by the spring 136 urging the spool 132 leftwardly decreases, whereas, if the axially movable conical disc 30 has moved leftwardly (viz., in the case of a reduction ratio is increased), the force by the spring 136 urging the spool 132 leftwardly increases. As mentioned before, the ports 118a and 118c of the line pressure regulator valve 102 are supplied with the output oil discharged by the oil pump 80, the inlet to the port 118a being provided with an orifice 142. The port 118b is always drained, the port 118d is connected by an oil conduit 144 to an inlet port 146 of the torque converter and a port 150c of the lock-up valve 108, the port 118e communicates via an oil conduit 148 with the lock-up clutch oil chamber 14 within the torque converter 12 and with a port 150b of the lock-up valve 108. For preventing the application of an excessive pressure to the interior of the torque converter 12, the oil conduit 144 is provided with an orifice 145. Applied to the spool 132 of the line pressure regulator valve 102 are two forces in the righward direction, one by the spring 134 and the other by the line pressure acting on a differential area between the lands 132a and 132b, and two forces in the leftward direction, one by the spring 136 and the other by the pressure at the port 118e acting upon a differential area between the land 132d and 132e, and the spool 132 adjusts the amount of drainage of the oil at the ports 118c via the port 118d and 118b (firstly the oil is drained via the port 118d into the oil conduit 144, and if it cannot afford the adjustment, the oil is drained via the port 118b, too), thus regulating the line pressure to balance the forces in the leftward and rightward directions. Therefore, the line pressure increases as the throttle opening degree increases, as a reduction ratio increases, and as the pressure at the port 118e (viz., the oil pressure building up within the lock-up clutch oil chamber 14) increases. (In this case, the torque converter 12 is in non lock-up state because the oil pressure in the chamber 14 is high.) The adjustment of the line pressure in this manner meets the actual demands, viz., the oil pressure must be increased to increase a force with which the pulleys are urged against the V-belt 32 so as to increase the torque transmission capacity which increases with increase in friction because the output torque of the engine increases as the throttle opening degree increases and the multiplication of the torque increases as the reduction ratio increases and besides the oil pressure must be increased to increase the transmission torque to deal with the multiplication function of the torque by the torque converter 12 when it operates in a non lock-up state prior to lock-up.

As the above mentioned rightward directed force acting upon the spool 132 via spring 134 in response to the engine output torque, a force due to a diaphragm device which is operative to create the force in response to an engine induction vacuum may be used instead of the force in response to the throttle opening degree. In this case the setting is made such that when the induction vacuum is high the force due to the spring 134 increases, whereas, when the induction vacuum is low, the force due to the spring 134 decreases, so that a similar result to that obtained in the use of the throttle opening is obtained.

The shift control valve 106 has a valve bore 122 formed with five ports 122a, 122b, 122c, 122d and 122e, and a spool 152 received in the valve bore 122 and formed with four lands 152a, 152b, 152c and 152d. The center port 122c communicates with the oil conduit 116 which is supplied with the line pressure, the left port 122b and right port 122d communicate via respective conduits 154 and 156 with the drive pulley cylinder chamber 28 of the drive pulley 24 and the driven pulley cylinder chamber 44 of the driven pulley 34. The port 122b communicates via an oil conduit 158 with a port 150d of the lock-up valve 108, too. Both of the end ports 122a and 122e are drained. The left end of the spool 152 is linked to a substantially middle portion of a lever 160 of the later-mentioned shift operating mechanism 112. The axial length of each of the lands 152b and 152c is slightly smaller than the width of the corresponding one of the ports 122b and 122d, whereas, the axial length between the lands 152b and 152c is substantially the same as the axial length between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. Conversely, urging the spool 152 to move rightwardly causes the reverse action to that mentioned above to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotatioal direction to cause the sleeve 162 to move leftwardly, the lever 160 moves in a clockwise rotational direction with its end portion received by the annular groove 30a of the axially movable conical disc 30 of the drive pulley 24 as an fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a reduction in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a low reduction ratio. This action causes the spool 152 and the drive pulley 24 and driven pulley 34 to assume a state accomplishing a reduction ratio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the shift in the continuously variable transmission by controlling the shift motor 110, alone.

The shift motor 110 is controlled by a shift control unit 300 which detects as an electric signal the revolution speed of the drive pulley 24 and the throttle opening degree, compares these detected values with a desired function, which is preset, of these variables so as to carry out a control to always accomplish desired operating condition, the control unit 300 being described later in more detail.

The lock-up valve 108 comprises a valve bore 150 formed with four ports 150a, 150b, 150c and 150d, a spool 170 having two lands 170a and 170b, and a spring 172 biasing the spool 170 rightwardly. The port 150d communicates with a port 122b of the shift control valve 106 through an oil conduit 158, the ports 150b and 150c communicate respectively through oil conduits 148 and 144 with the port 118e of the line pressure regulator valve 102 and the port 118d thereof, and the port 150a is drained. The oil conduits 144 and 158 and a drain oil conduit extending from the port 150a are provided with orifices 174, 176 and 178, respectively. The same oil pressure as that applied to the torque converter inlet port 146 is applied to the port 150c via the oil conduit 144, but when the oil pressure applied to the port 150d via the oil conduit 158 (the same oil pressure as that within the drive pulley cylinder chamber 28) is high enough as to press the spool 170 to the left against the force of the spring 172, the port 150c is blocked by the land 170b and the port 150b is drained via the port 150a. Therefore, the lock-up clutch oil chamber 14 which communicates with the port 150b via the oil conduit 148 is drained, thus permitting the lock-up clutch 10 to assume an engaged state by the pressure within the torque converter 12, rendering the torque converter to operate in lock-up state wherein the torque converter has no function as a torque converter. Conversely, if the oil pressure at the port 150d decreases to cause a leftwardly directed force to become smaller than a rightwardly directed force due to the spring 172, spool 170 moves rightwardly to a position wherein the port 150b is allowed to communicate with the port 150c. This causes the oil conduit 148 to communicate with the oil conduit 144, allowing the same oil pressure as that applied to the torque converter inlet port 146 to reach the lock-up clutch oil chamber 14, allowing the pressures on the both sides of the lock-up clutch 10 to become equal to each other, resulting in the release of the lock-up clutch 10. The orifice 178 is provided to prevent rapid drainage of the oil pressure from the lock-up clutch oil chamber 14 so as to alleviate a shock upon shifting into lock-up state, whereas, the orifice 174 is provided in the oil conduit 144 to permit a gradual increase in oil pressure within the lock-up oil chamber 14 so as to alleviate a shock upon release of the lock-up state. An orifice 176 is provided in an oil conduit 158 to prevent the occurrence of a chattering in the lock-up valve 108 owing to small variation in oil pressure in the drive pulley cylinder chamber 28.

The torque converter outlet port 180 communicates with the oil conduit 182 which is provided with a relief valve 188 including a ball 184 and a spring 186 and thus, with this relief valve, the pressure within the torque converter 12 is maintained at a constant pressure. The oil downstream of the relief valve 188 is introduced by an oil conduit 190 to an oil cooler and a lubricant circuit, both unillustrated, and is finally drained, whereas, excessive oil is drained by another relief valve 192, the drained oil being returned finally to a tank 114.

Figure 5:
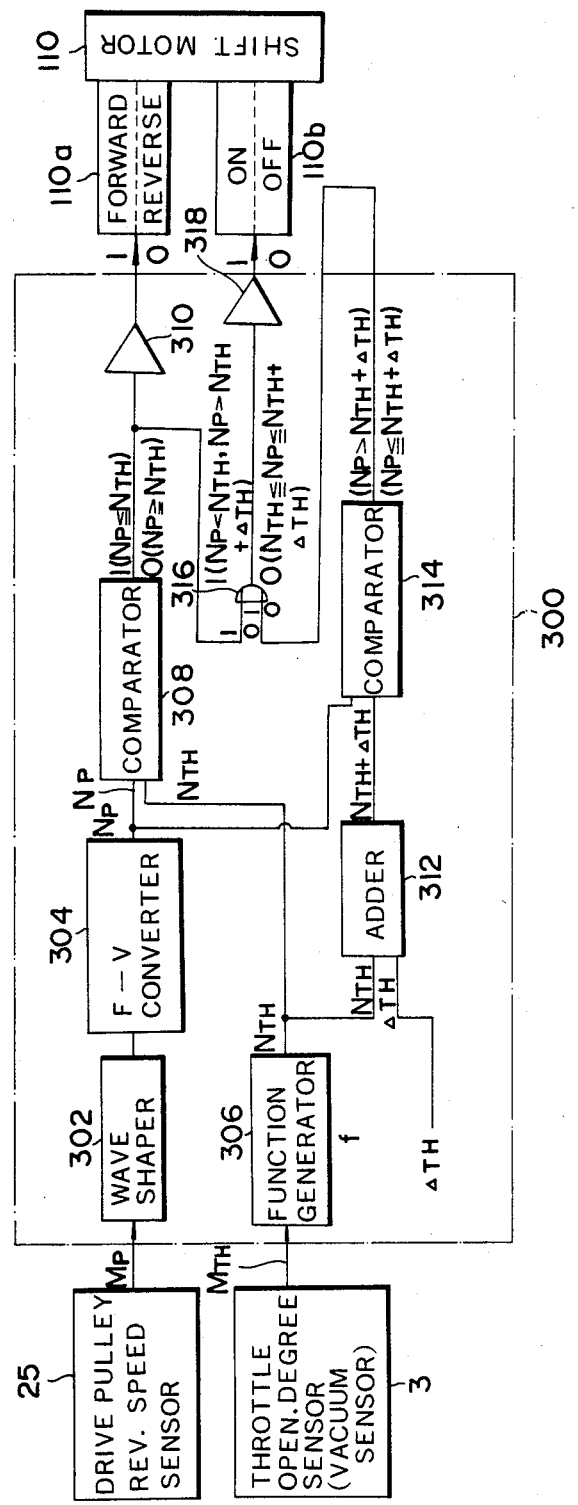
FIG. 5 is a block diagram of a control unit for the shift motor of FIG. 2.

Next, the shift control unit for carrying out a shift control method according to the present invention is explained. FIG. 5 is a block diagram of the shift control unit 300. A drive pulley revolution speed sensor 25, mounted to the drive pulley 24, generates a pulse train signal Mp indicative of the revolution speed of the drive pulley 24 to the control unit 300. This pulse train signal is shaped by a wave shaper circuit 302 and converted by a F/V converter 304 into an electric voltage signal Np. Therefore, Np comprises a voltage level proportional to the speed or revolution of the drive pulley 24. An electric voltage signal $M_{TH}$ is detected which is indicative of the throttle opening degree as detected by the throttle opening degree sensor 3 provided to the carburetor portion of the engine, this signal $M_{TH}$ being fed to the function generating circuit 306. The electric voltage signal $M_{TH}$ is converted into an electric voltage signal $N_{TH}$ in accordance with a function f which is stored in the function generator circuit 306. The above mentioned function f provides a lower limit value of engine revolution speed in terms of throttle opening degree, viz., a lower limit value of engine revolution speed at any given throttle opening degree (viz., at any value in $M_{TH}$, and produce an electric voltage signal $N_{TH}$ indicative of such value. The function f may be set in any desired manner, and thus may be set to provide a value of engine revolution speed which satisfies a minimum fuel consumption relationship of the engine revolution speed with the throttle opening degree. The signal Np and the signal $N_{TH}$ are compared with each other in a first comparator 308 which provides a 1 level signal when $Np < N_{TH}$ (viz., when the actual drive pulley revolution speed is lower than the desired engine revolution speed) or provides a 0 level signal when $Np \geq N_{TH}$ (viz., when the actual drive pulley revolution speed is higher than the desired engine revolution speed). This output signal is amplified by an amplifier 310 and then fed to a relay 110a for switching the direction of rotation of the shift motor 110. The relay 110a acts to effect a positive rotation of the shift motor 110 (a rotational direction which causes an increase in reduction ratio) when it receives the 1 level signal or to effect a reverse rotation of the motor (viz., a direction which causes a reduction in reduction ratio) when it receives the 0 level signal. The output $N_{TH}$ of the function generator 306 is fed also to an adder circuit 312 where an electric voltage $\Delta TH$ representing a deviation from a desired engine revolution speed is added and the result is compared with Np at a second comparator 314. The comparator 314 provides a 1 level signal when $Np > N_{TH} + \Delta TH$ (viz., when the actual drive pulley revolution speed is higher than a predetermined upper limit of desired engine revolution speed) or provides a 0 level signal when $Np \leq NTH + \Delta TH$ (viz., when the drive pulley revolution speed is equal to or lower than the predetermined upper limit of desired engine revolution speed). The output of the second comparator 314 and that of the first comparator 308 are fed to a logical AND gate 316. The logical AND gate 316 provides as an output 0 level signal only when the output signals from the both comparators 308 and 314 are at 0 levels (viz., when $N_{TH} \leq Np \leq N_{TH} + \Delta TH$), and provides a 1 level signal otherwise (viz., when $Np < N_{TH}$ or $Np > N_{TH} + \Delta TH$). This output is amplified by a signal amplifier 318 and then fed to an ON-OFF relay 110b of the shift motor 110 to actuate the shift motor 110 when it receives a 1 level signal or to stop the motor 110 when it receives a 0 level signal. With the circuit constructed in the previously described manner, in the case $N_{TH} \leq Np \leq N_{TH} + \Delta TH$ (viz, when the actual drive pulley revolution speed is within a permissible deviation from any desired engine revolution speed), the shift motor 110 is not actuated, thus maintaining the current reduction ratio. When $Np < N_{TH}$, the shift motor 110 rotates in the positive direction to increase reduction ratio, and when $Np > N_{TH} + \Delta TH$, the shift motor 110 rotates in the reverse direction to decrease reduction ratio. This, the actual drive pulley revolution speed is maintained within a desired range.

Referring now to function f stored in the function generator circuit 306, an explanation is made hereinafter of a preferred manner of operating an engine along the minimum fuel consumption rate curve.

Figure 6:
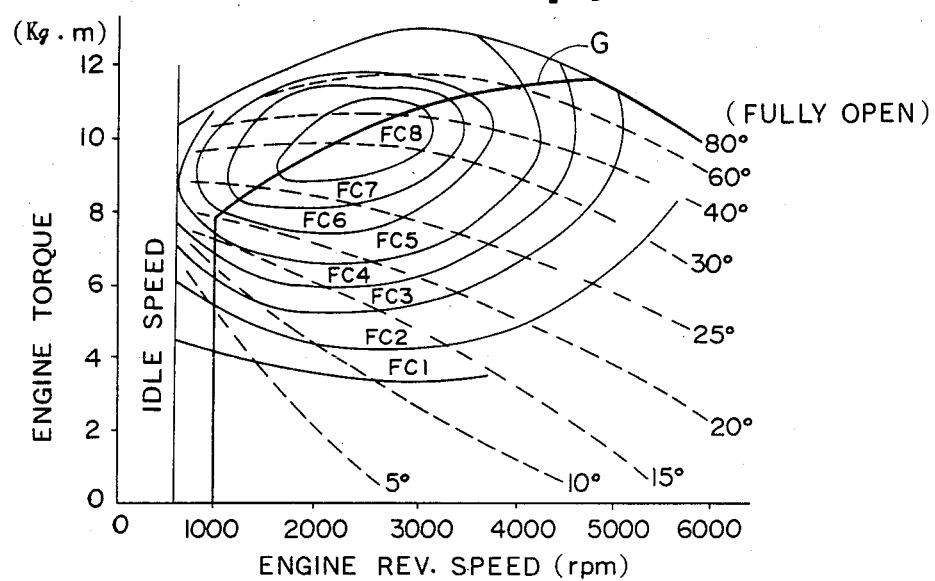
FIG. 6 is a performance characteristic of an engine used with the continuously variable transmission shown in FIG. 2 showing engine torque vs., engine revolution speed characteristic curves, shown by the broken line, each curve for any value in throttle opening degree, isofuel consumption rate curves FC1 through FC8 and a minimum fuel consumption rate curve G shown by the bold solid line.
Figure 7:
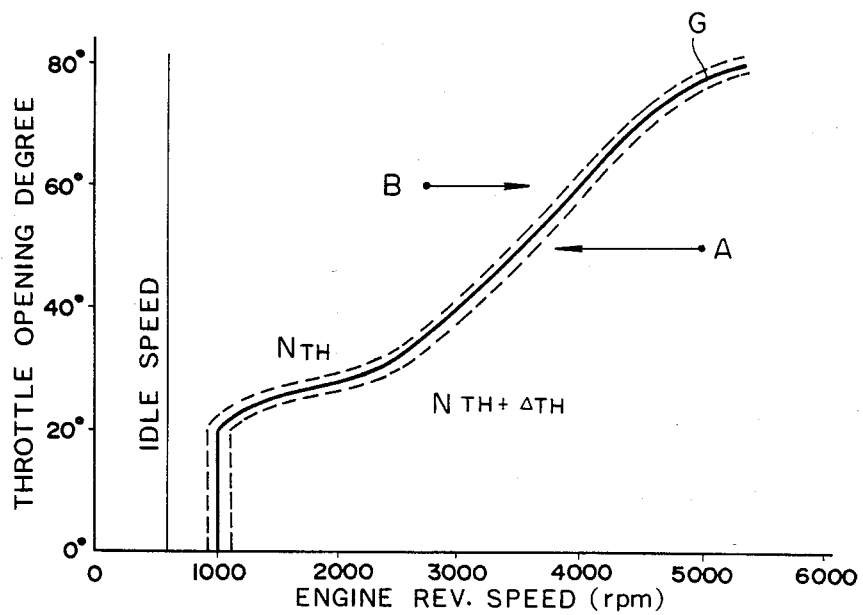
FIG. 7 is throttle opening vs., engine revolution speed characteristic of the minimum fuel consumption rate curve G accompanied by an upper limit and lower limit curve shown by the broken line.
Figure 8:
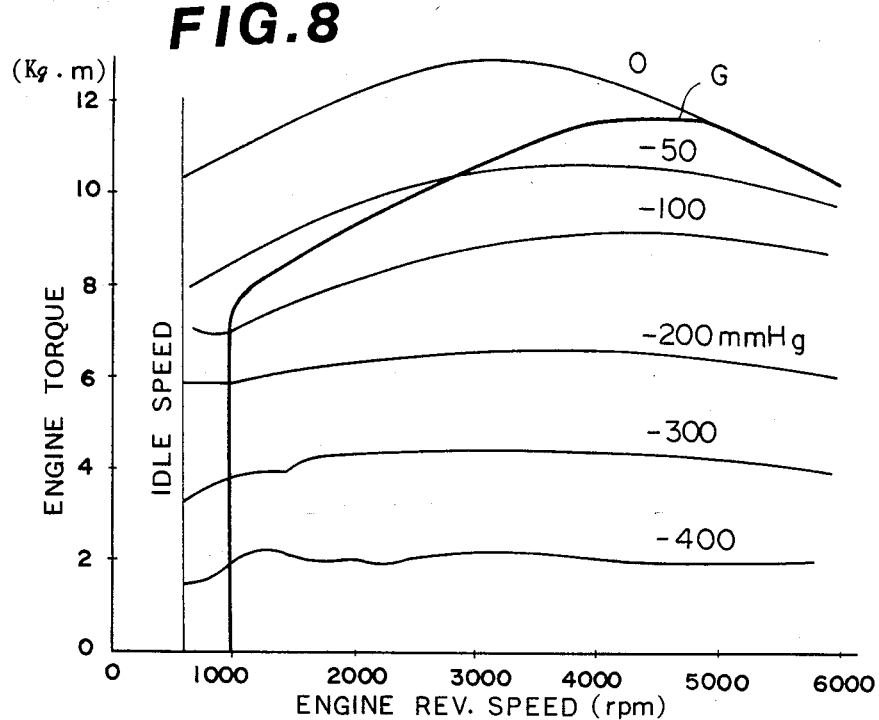
FIG. 8 is a performance characteristic of the engine expressed in terms of engine torque vs., engine revolution speed characteristic curves each for any value in induction vacuum.
Figure 9:
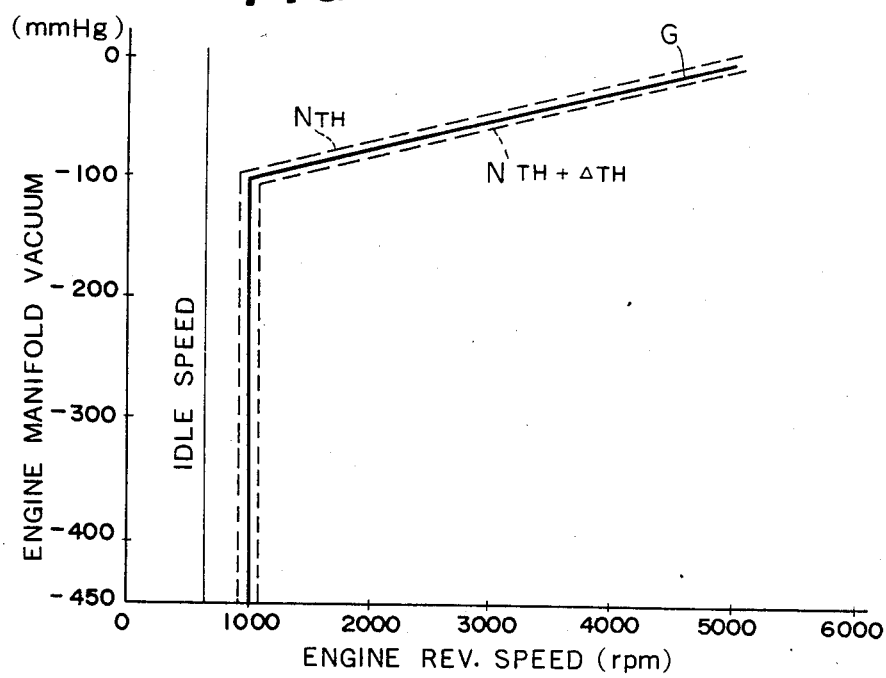
FIG. 9 is a minimum fuel consumption rate curve G expressed in terms of engine manifold vacuum vs., engine revolution speed.
Figure 10:
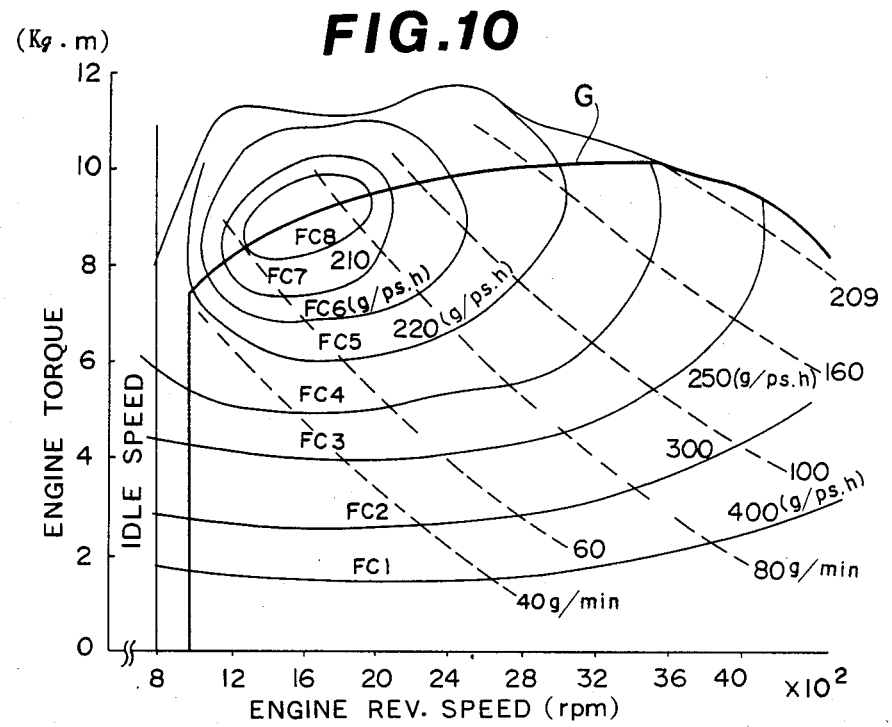
FIG. 10 is a performance characteristic of a diesel engine showing engine torque vs., engine revolution speed characteristic curves shown by the solid line, each for any value in the amount of fuel injection and isofuel consumption curves FC1 through FC8 (400 g/ps.h), FC2 (300 g/ps.h), FC3 (250 g/ps.h), FC4, FC5 (220 g/ps.h), FC6, FC7 (210 g/ps.h), and FC8.
Figure 11:
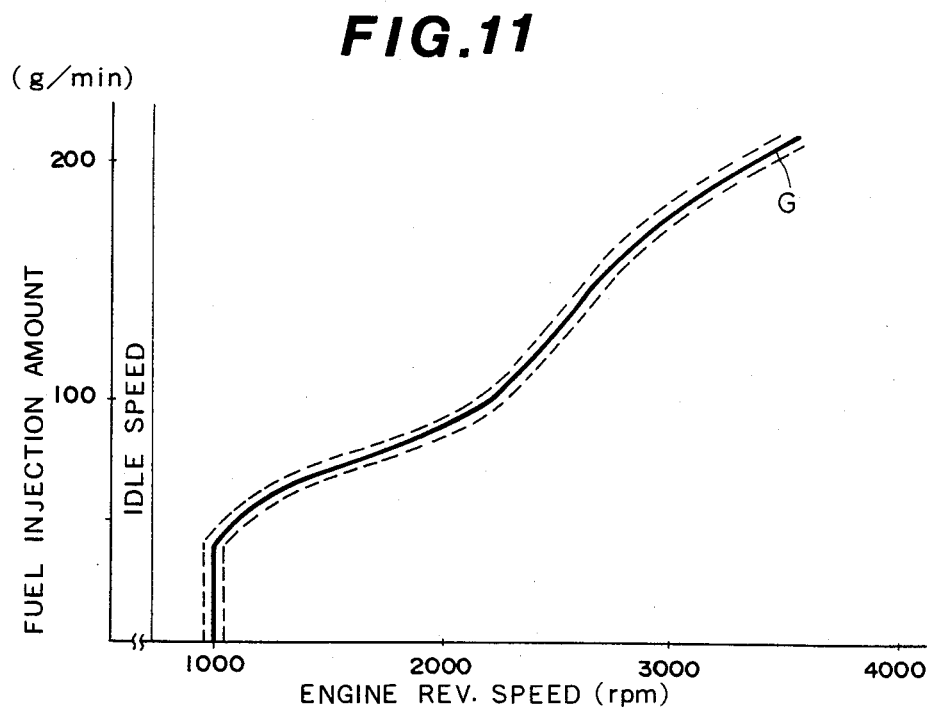
FIG. 11 is the minimum fuel consumption rate curve G expressed in terms of fuel injection amount vs., engine revolution speed.

FIG. 6 is a graph illustrating an engine performance. In the graph, engine revolution speed is expressed on the axis of abscissas and engine torque on the axis of ordinates and there are shown a family of engine torque vs., engine revolution speed characteristic curves corresponding to various throttle opening degrees (each curve being accompanied by an indication of throttle opening degree. There are also shown isofuel consumption rate curves FC1~FC8 (fuel consumption rate reducing in this numerical order). The minimum fuel consumption rate curve G as shown by the solid line is obtained by connecting the minimum fuel consumption points. If the engine is operated to satisfy this minimum fuel consumption rate curve G, the fuel consumption rate of the engine can be minimized. The minimum fuel consumption rate curve may be expressed as shown in FIG. 7 in a graph with engine revolution speed on the axis of abscissas and with the throttle opening degree on the axis of ordinates. In order to always operate the engine in such a manner so to satisfy the minimum fuel consumption rate curve, the continuously variable transmission must be controlled such that if the engine revolution speed is higher than the minimum fuel consumption rate curve G, such as at a point A, the reduction ratio is decreased to cause an reduction in engine revolution speed; whereas if the engine revolution speed is lower than the minimum fuel consumption rate curve G such as at a point B, the reduction ratio is increased to cause an increase in engine revolution speed. If in this manner the engine is operated within a predetermined range of the minimum fuel consumption rate curve to satisfy the object of operating the engine near or at the minimum fuel consumption rate. If the function generator circuit 306 is made to store as $N_{TH}$ the lower limit value of the above mentioned predetermined range of the minimum fuel consumption rate curve, and as $N_{TH}+\Delta TH$ the upper limit value thereof, the function generator will generate a desired engine revolution speed at any given throttle opening degree $M_{TH}$, thus operating the shift motor 110 in the above-mentioned predetermined manner to cause the engine to always operate within the predetermined range of the above-mentioned minimum fuel consumption rate curve. Although, in the above description, the minimum fuel consumption rate curve is expressed in terms of throttle opening degree, it may also be expressed in terms of induction manifold vacuum wherein the engine performance characteristic may be illustrated as shown in FIG. 8 and the minimum fuel consumption rate curve may be illustrated as shown in FIG. 9. When the induction manifold vacuum is used as a variable, the previously mentioned throttle opening sensor 3 must be replaced with an induction manifold vacuum sensor. If the invention is to be applied to a diesel engine, neither the throttle opening degree nor the induction manifold vacuum can be employed as an engine power output indication and thus in this case the a signal indicative of the fuel supply, viz., the fuel injection amount, is used instead. In this case, the engine performance characteristic may be illustrated as shown in FIG. 10 and the minimum fuel consumption rate curve may be illustrated as shown in FIG. 11 in a similar manner to that shown in FIG. 7. The engine power output signal in terms of the amount of fuel injection can preferably be obtained from of a sensor provided to detect the displacement of a fuel injection amount control lever or rack.

The shift pattern diagram in the case the shift is controlled in the above mentioned manner is illustrated in FIG. 12. In the case, for example, the throttle opening degree is made constant at 40°, the engine revolution speed is held in the neighbourhood of 3,000 r.p.m. so as to make the fuel consumption minimum (refer FIG. 6) and the vehicle speed varies from 25 Km/h to 85 Km/h. The reason why the shift lines exist within a region below a line L which connects the maximum reduction ratio points is that within this region the oil pressure in the oil conduit 158 is too low to actuate the lock-up control valve 108, allowing the torque converter to operate in converter state to permit full use of slip within the torque converter 12. According to the present invention, the drive pulley revolution speed is detected instead of the engine revolution speed to effect the shift control because the engine revolution speed becomes higher than the drive pulley revolution speed when the torque converter operates in non lock-up state and as a torque converter, viz., during kickdown or up-climbing of a steep slope or start-up. Therefore, while the torque converter 12 operates to perform torque multiplication function, the maximum reduction ratio is kept to produce a strong traction power, and since the shift is not yet initiated lock-up is not effected. Once, the lock-up has been effected, the engine revolution speed correspond to drive pulley revolution speed as described above and thereafter shifting is carried to satisfy the minimum fuel consumption rate curve as shown in FIG. 7 or FIG. 9.

Although the above-mentioned shift control is intended to satisfy the minimum fuel consumption rate, it is possible to provide a different function generator circuit to carry out a shift pattern which satisfies the maximum torque curve of the engine while enabling the engine to produce maximum acceleration. In order to allow the selective use of either shift pattern, it is possible to select, when the manual valve 104 is set in the D position, the shift pattern providing the minimum fuel consumption rate is, while, if the manual valve 104 is set in L position, the shift pattern providing the maximum acceleration.

In the shift control system according to the present invention, a kickdown operation is provided by setting the speed of action of the shift motor 110 at a rate higher than that of the V-belt pulley mechanism. If the accelerator pedal is depressed rapidly to fully open the throttle valve, the $M_{TH}$ and $N_{TH}$ become maximum to satisfy $N_{TH} > Np$, tending to operate the shift motor 110 in a direction to increase the reduction ratio. Since this operation is not followed by an actual shift operation by the V-belt pulley mechanism, the shift motor 110 acts effectively on the shift control valve 106 to move the shift control valve 106 in a direction to increase the reduction ratio, viz., a state wherein the spool 152 is disposed in the rightmost position. This causes an increase in reduction ratio to produce strong traction power, and a corresponding reduction in pressure in the oil conduit 158 which allows the lock-up valve 108 to release the lock-up state of the torque converter 12, thereby allowing the torque converter 12 to multiply the torque, further augmenting the traction force and increasing the kickdown effect.

As having been described, according to the present invention, an actual revolution speed of a drive pulley and a parameter indicative of engine output torque, such as a throttle opening degree, an intake manifold vacuum and an amount of fuel supply, are detected. A desired value in engine revolution speed is determined for a value in the parameter using a predetermined function defining a desired value in engine revolution speed for any value in the parameter indicative of the engine output torque. The shift motor is operated in such a manner as to maintain the revolution speed of the drive pulley in a predetermined relationship with the desired value in engine revolution speed. It will be appreciated that because the number of sensors to be used is only two, viz., a throttle opening sensor (or an induction manifold vacuum sensor or fuel injection amount sensor provided at a fuel injection pump) and a driven pulley revolution speed sensor, the invention can be carried out at very small cost. According to the present invention, the prospect of malfunction and trouble is very small because a very simple feed back control is used. If a function indicative of the minimum fuel consumption rate is used as the above mentioned function, an engine always operates with the minimum fuel consumption rate, thus contributing to the fuel savings. An effective kickdown can be provided by actuating the shift motor more swiftly than the actual shift between the V-belt pulley mechanism.

What is claimed is:

1. A continuously variable transmission for an automotive vehicle including an internal combustion engine, the continuously variable transmission comprising a V-belt, a drive pulley and a driven pulley wherein the V-belt operatively engages said drive and driven pulleys, each of said pulleys having a fluid chamber and two conical discs, a first conical disc of the drive pulley being secured to a drive shaft adapted to be driven by the engine, a first conical disc of the driven pulley being secured to a driven shaft, a second conical disc of the drive pulley being controllably movable in an axial direction of the drive shaft in response to a pressure of a fluid in the fluid chamber thereof, a second conical disc of the driven pulley being controllably movable in an axial direction of the driven shaft in response to a pressure of the fluid in the fluid chamber thereof, said continuously variable transmission comprising:

pumping means for supplying fluid having a first fluid pressure;
a first control valve for receiving the fluid supplied by said pumping means and for supplying the fluid with a discharge pressure;
a second control valve connected to the first control valve to receive the discharge pressure fluid therefrom for regulating fluid supply to and discharge from both of the fluid chambers said second control valve having a spool for determining a reduction ratio of the continuously variable transmission;
a lever having first and second ends, and a middle portion linked to one end of said spool and operable to displace said spool, said first end being displaceable according to an axial position of the second conical disc of said drive pulley;
said first control valve having means operatively connected with said first end of said lever for regulating the discharge pressure fluid supplied to said second control valve in response to the position of said first end of said lever;
an electric shift motor means for displacing said second end of said lever;
a control unit including:
means for detecting a revolution speed of the drive pulley and for generating a pulley revolution speed indicative signal;
means for detecting a parameter indicative of engine output torque and for generating a torque indicative signal;
means, responsive to the output torque indicative signal, for determining a desired value in engine revolution speed using a predetermined function which defines, for any value of output torque, a desired value in engine revolution speed and for generating a desired engine speed indicative signal;
means for comparing said pulley revolution speed indicative signal with said desired engine speed indicative signal, and for generating a comparison signal; and
means, responsive to said comparison signal, for operating said shift motor to control the reduction ratio of the continuously variable transmission to decrease any difference between said pulley revolution speed indicative signal and said desired engine speed indicative signal.

2. A continuously variable transmission for an automotive vehicle including an internal combustion engine, the continuously variable transmission comprising a V-belt, a drive pulley and a driven pulley, wherein the V-belt operatively engages the drive and driven pulleys, each of the pulleys having a fluid chamber and two conical discs, a first conical disc of the drive pulley being secured to a drive shaft adapted to be driven by the engine, a first conical disc of the driven pulley being secured to a driven shaft, a second conical disc of the drive pulley being controllably movable in an axial direction of the drive shaft in response to a pressure of fluid in the fluid chamber thereof, a second conical disc of the driven pulley being controllably movable in an axial direction of the driven shaft in response to a pressure of the fluid in the fluid chamber thereof, said continuously variable transmission comprising:

a pumping means for supplying the fluid;
a first control valve for receiving the fluid supplied by said pumping means and for supplying the fluid with a discharge pressure;
a second control valve connected to the first control valve to receive the discharge pressure fluid therefrom for regulating fluid supply to and discharge from the fluid chambers, said second control valve having a spool for determining a reduction ratio of the continuously variable transmission;
a lever having first and second ends, and a middle portion linked to one end of said spool, and operable to displace said spool, said first end being displaceable according to an axial position of the second conical disc of said drive pulley;
said first control valve having means operatively connected with said first end of said lever for regulating the discharge pressure fluid supplied to said second control valve in response to the position of said first end of said lever;
a shift motor for displacing said second end of said lever;
a control unit including:
means for detecting a revolution speed of the drive pulley and generating a pulley revolution speed indicative signal;
means for detecting a parameter indicative of engine output torque and for generating an output torque indicative signal;
means, responsive to said output torque indicative signal, for determining a desired value of engine revolution speed using a predetermined function which defines, for any value of output torque, a desired value of engine revolution speed and for generating a first desired engine revolution speed indicative signal;

means for combining a predetermined value signal with said first desired engine revolution speed indicative signal and generating a second desired engine revolution speed indication signal;

means for comparing said pulley revolution speed indicative signal with said first desired engine revolution speed indicative signal and for generating a first comparison signal;

means, responsive to said first comparison signal, for determining a direction of rotation of said shift motor and for setting the shift motor for rotation in said direction;

means for comparing said pulley revolution speed indicative signal with said second desired engine revolution speed and for generating a second comparison signal; and means, responsive to said first and second comparison signals, for determining when to actuate said shift motor and for thereupon generating a shift motor actuation signal.

3. A continuously variable transmission as claimed in claim 2, wherein the shift motor has a speed of action which is set at a rate higher than that of an axial rate of resulting movement of the second conical disc of the drive pulley.

4. A method for controlling a continuously variable transmission of an automotive vehicle having an internal combustion engine, the continuously variable transmission comprising a V-belt, a drive pulley and a driven pulley wherein the V-belt operatively engages the drive and a driven pulleys, each of said pulleys having a fluid chamber and two conical discs, a drive shaft adapted to be driven by the engine, a driven shaft, a first conical disc of the drive pulley being secured to the drive shaft, a first conical disc of the driven pulley being secured to the driven shaft, a second conical disc of the drive pulley being controllably movable in an axial direction of the drive shaft in response to the fluid pressure in the fluid chamber thereof, a second conical disc of the driven pulley being controllably movable in an axial direction of the driven shaft in response to a fluid pressure in the fluid chamber thereof, a shift control valve actuated by a shift motor for controlling a reduction ratio of the continuously variable transmission by regulating fluid supply to and discharge from at least one of the fluid chambers, the method comprising the steps of:

detecting a revolution speed of the drive pulley and generating, in response to said detected speed, a pulley revolution speed indicative signal;

detecting a parameter indicative of engine output torque and generating, in response thereto, an output torque indicative signal;

determining, responsive to said output torque indicative signal, a first desired value of engine revolution speed using a predetermined function which defines for any value of output torque, a first desired value of engine revolution speed and generating, in response thereto, a first desired engine revolution speed indicative signal;

combining a predetermined value signal with said first desired engine revolution speed indicative signal and generating a second desired engine revolution speed indicative signal;

comparing said pulley revolution speed indicative signal with said first desired engine revolution speed indicative signal and generating a first comparison signal;

determining, based on said comparison signal, a direction of rotation of said shift motor;

setting of the shift motor for rotation in said direction of rotation;

comparing said pulley revolution speed indicative signal with said second desired engine revolution speed and generating a second comparison signal; and determining, in response to said first and second comparison signals, when to actuate the shift motor and there upon generating a shift motor actuation signal.

5. A method as claimed in claim 4, wherein said parameter comprises at least one of a throttle valve position, an intake manifold pressure and a fuel supply amount.

6. A method as claimed in claim 4, wherein said predetermined function is defined by a curve which connects a plurality of points which represent values of engine revolution speed at which the engine will operate at approximately minimum fuel consumption for a given value of said parameter.

7. A method as claimed in claim 4, wherein the shift motor has a speed of action and said method further comprises setting the speed of action at a rate higher than that of an actual rate of shift operation of the reduction ratio of the drive pulley and driven pulley resulting from the action of the shift motor.

* * * * *